United States Patent
Choi et al.

(10) Patent No.: US 8,514,254 B2
(45) Date of Patent: Aug. 20, 2013

(54) APPARATUS AND METHOD FOR PROCESSING DIGITAL IMAGES

(75) Inventors: Min-Seok Choi, Suwon-si (KR); Young-Hun Joo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 877 days.

(21) Appl. No.: 12/648,460

(22) Filed: Dec. 29, 2009

(65) Prior Publication Data
US 2010/0164995 A1    Jul. 1, 2010

(30) Foreign Application Priority Data
Dec. 29, 2008  (KR) .................. 10-2008-0136030

(51) Int. Cl.
*G09G 5/391* (2006.01)

(52) U.S. Cl.
CPC ..................... *G09G 5/391* (2013.01)
USPC .......... 345/667; 345/660; 345/670; 345/619; 345/671; 345/698; 345/629

(58) Field of Classification Search
CPC ..................... G09G 5/391
USPC .......... 345/667, 660, 670, 671, 698, 629
See application file for complete search history.

(56) References Cited

U.S. PATENT DOCUMENTS

| | | | |
|---|---|---|---|
| 6,181,382 B1 * | 1/2001 | Kieu et al. .................. 348/459 |
| 8,204,131 B2 * | 6/2012 | Zador et al. .............. 375/240.25 |
| 8,249,237 B2 * | 8/2012 | Jeong et al. .............. 379/202.01 |
| 2001/0017667 A1 * | 8/2001 | Frink et al. .................. 348/458 |
| 2002/0063724 A1 * | 5/2002 | Powers et al. ................ 345/629 |
| 2003/0117513 A1 * | 6/2003 | Anderson .............. 348/333.11 |
| 2004/0160525 A1 * | 8/2004 | Kingetsu et al. .............. 348/364 |
| 2004/0240752 A1 * | 12/2004 | Dobbs et al. .................. 382/276 |
| 2005/0036701 A1 * | 2/2005 | Miyazawa et al. ............ 382/240 |
| 2005/0135708 A1 * | 6/2005 | Joyce ............................ 382/306 |
| 2006/0033753 A1 * | 2/2006 | Lai ............................... 345/629 |
| 2006/0050082 A1 * | 3/2006 | Jeffrey ......................... 345/606 |
| 2006/0055808 A1 * | 3/2006 | Maeng et al. ............. 348/333.11 |
| 2006/0139474 A1 * | 6/2006 | Endsley et al. .......... 348/333.11 |
| 2006/0176376 A1 * | 8/2006 | Dyke et al. ................. 348/222.1 |
| 2006/0232808 A1 * | 10/2006 | Lyons et al. ................. 358/1.13 |
| 2007/0018999 A1 * | 1/2007 | Rai et al. ..................... 345/619 |
| 2007/0035759 A1 * | 2/2007 | Fujimori ..................... 358/1.13 |
| 2007/0153093 A1 * | 7/2007 | Lin et al. ................... 348/222.1 |
| 2007/0236512 A1 * | 10/2007 | Huang et al. ................. 345/634 |
| 2007/0247532 A1 * | 10/2007 | Sasaki ...................... 348/231.99 |
| 2008/0043133 A1 * | 2/2008 | Sasaki et al. .................. 348/341 |
| 2008/0253457 A1 * | 10/2008 | Moore ...................... 375/240.16 |
| 2009/0040339 A1 * | 2/2009 | Lee ............................ 348/231.2 |
| 2009/0049409 A1 * | 2/2009 | Leclercq et al. .............. 715/838 |
| 2009/0141808 A1 * | 6/2009 | Wong ........................ 375/240.25 |
| 2009/0271873 A1 * | 10/2009 | Ram et al. ..................... 726/29 |
| 2010/0110222 A1 * | 5/2010 | Smith et al. ................. 348/222.1 |
| 2010/0158409 A1 * | 6/2010 | Sundareson et al. .......... 382/282 |
| 2010/0292002 A1 * | 11/2010 | Ward et al. ..................... 463/30 |
| 2011/0194765 A1 * | 8/2011 | Sasaki ........................... 382/167 |
| 2011/0205332 A1 * | 8/2011 | Jeong et al. ................. 348/14.08 |
| 2012/0237181 A1 * | 9/2012 | Ando et al. ................... 386/240 |

\* cited by examiner

*Primary Examiner* — Javid A Amini
(74) *Attorney, Agent, or Firm* — Sughrue Mion, PLLC

(57) ABSTRACT

An apparatus and method for processing a digital image are provided, including a decoder that decodes a high-resolution image and outputs the decoded high-resolution image, a resizer that resizes a thumbnail image to a size to be displayed on a display, and a controller that outputs the resized thumbnail image on the display, then replaces the thumbnail image with the decoded high-resolution image.

16 Claims, 3 Drawing Sheets

APPARATUS AND METHOD FOR PROCESSING DIGITAL IMAGES

PRIORITY CLAIM

This application claims priority from Korean Patent Application No. 10-2008-0136030 filed in the Korean Intellectual Property Office on Dec. 29, 2008, the entire disclosure of which is hereby incorporated by reference.

BACKGROUND

1. Field

Apparatuses and methods consistent with embodiments relate generally to processing a digital image. More particularly, the apparatuses and methods relate to a high-resolution digital image in a device using limited resources such as a mobile terminal.

2. Description of the Related Art

Generally, various types of videos and images including movies and TV programs are produced and used. The proliferation of information devices such as a Personal Computer (PC), the popularity of digital cameras and color printers, and the drastic increase in Internet users are driving forces behind the growth of digital image culture in daily living. Meanwhile, coding compression technologies have been standardized for still images and moving pictures, such as Joint Photographic Experts Group (JPEG) and Moving Picture Experts Group (MPEG), and images are provided and reproduced with increased convenience using recording media like a Compact Disc-Read Only Memory (CD-ROM) or transmission media such as a network or broadcasting waves.

Conventional analog image processing is now giving way to digital processing of objects like still images or moving pictures. This trend will continue to increase.

As digital cameras have recently become popular, users may now capture objects digitally at any time in any place. Further, equipment with high-performance, high-capacity storage media has become more sophisticated.

Owing to the development of integration technology, mobile terminals such as portable phones or portable media players (PMPs) may be equipped with high-resolution capturing devices and provide high-resolution images stored in memories to users on a display like a Liquid Crystal Display (LCD). Accordingly, users' demands for high-resolution images are also increasing.

However, compared to a desktop computer or a laptop computer, a mobile terminal like a portable phone or a PMP has limited hardware with low performance capabilities, and generally requires a long loading time to decode a user-requested high-resolution image. Specifically, the loading time increases as the resolution or size of the image increases. Since the mobile terminal does not provide a notification to the user of the long loading time during the long loading time, the user does not know if the device is loading the image during the wait for the loading time or if the mobile terminal has simply failed to perform the requested task.

Moreover, no screen is displayed on the display until the decoding of the user-selected image is completed. Hence, the user does not know whether the selected image is the one they need until the completion of the decoding. Especially when the user views images one by one, the time required for loading the images becomes burdensome.

SUMMARY

One or more exemplary embodiments provide a method and apparatus for reducing a user-perceived waiting time for displaying a high-resolution image by providing a low-resolution image corresponding to a user-selected high-resolution image to the user during decoding of the high-resolution image.

In accordance with an aspect of an exemplary embodiment, there is provided an apparatus for processing a digital image, including a decoder that decodes a high-resolution image and outputs the decoded high-resolution image, a resizer that resizes a thumbnail image according to a size and resolution of a display, and a controller that outputs the resized thumbnail image on the display, then replaces the thumbnail image with the decoded high-resolution image.

In another exemplary embodiment, there is provided an apparatus for displaying a high-resolution digital image on a mobile terminal, the apparatus comprising a decoder that decodes the high-resolution digital image, a controller that displays a thumbnail image of the high-resolution image on a display of a mobile terminal while the decoder is decoding the high-resolution digital image; and replaces the thumbnail image with the decoded high-resolution digital image.

In accordance with another exemplary embodiment, there is provided a method for processing a digital image in a digital image processing apparatus, resizing a thumbnail image according to a size and resolution of a display, decoding a high-resolution image, and replacing the thumbnail image with the decoded high-resolution image.

In another exemplary embodiment, a method for displaying a high-resolution digital image on a mobile terminal comprises decoding a high-resolution digital image, displaying a thumbnail image of the high-resolution image on a display of a mobile terminal while the high-resolution image is being decoded; and replacing the thumbnail image with the decoded high-resolution digital image.

BRIEF DESCRIPTION OF THE DRAWINGS

The above and/or other aspects will be more apparent from the following detailed description of exemplary embodiments taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In general, a digital camera uses a Joint Photographic Experts Group (JPEG) file format to compress and store a captured image. A mobile terminal like a portable phone also processes a digital image using the JPEG file format.

The following description will be made in the context of processing a digital image using a JPEG file format, by way of example.

Figure 1:
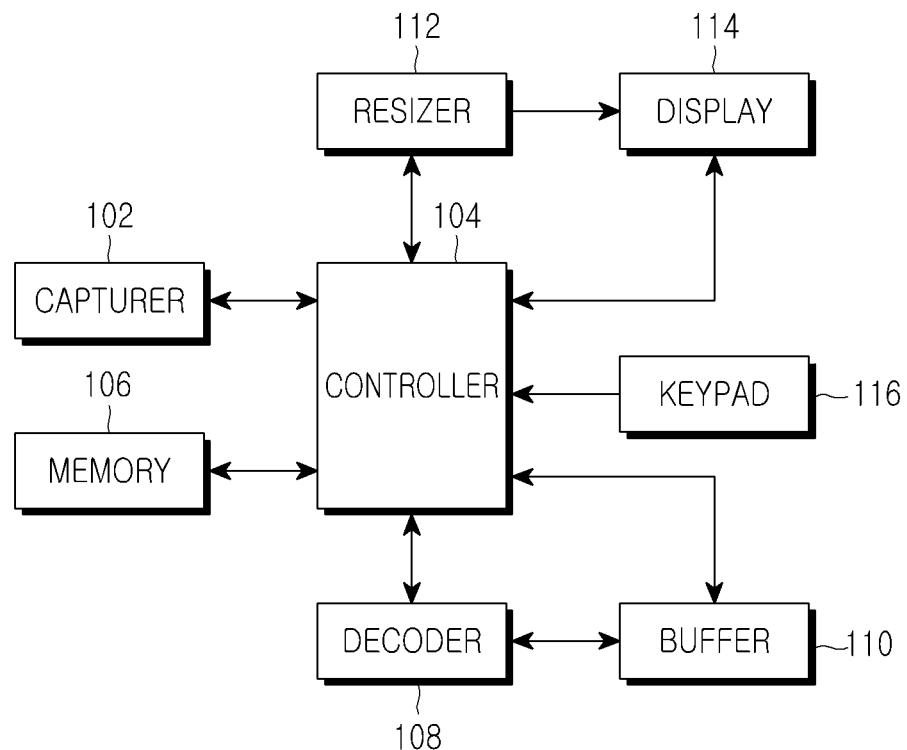
FIG. 1 is a block diagram of a digital image processing apparatus according to an exemplary embodiment.

FIG. 1 is a block diagram of a digital image processing apparatus 100 according to an exemplary embodiment.

A mobile terminal equipped with a camera is one non-limiting example of the digital image processing apparatus 100.

Referring to FIG. 1, a capturer 102 includes a lens (not shown), an iris (not shown), an optical low-pass filter (not shown), a Charge-Coupled Device (CCD) (not shown), and a signal processor (not shown). Potential is accumulated in the CCD according to the light intensity of an image formed on the light receiving surface of the CCD and is read as a voltage signal. The voltage signal is broken down into red, green and blue (RGB) components and subjected to white balance adjustment and gamma correction. Then the RGB signal is converted to digital image data by analog-to-digital conversion to create a digital image. A controller 104 stores the digital image captured by the capturer 102 in a memory 106.

For storing the digital image in the memory 106, the controller 104 encodes the digital image using two methods, sequential and progressive. The progressive encoding method initially renders an image at a low resolution and sequentially increases the resolution of the image. Hence, an initially-rendered progressive-encoded image is wholly perceivable, although it is initially blurry. In contrast, the sequential encoding method sequentially renders parts of an image, starting from the left upper end. It may therefore be difficult to identify the image until at least half of the image is rendered.

In general, when a high-resolution digital image is encoded, it is divided into blocks each having a predetermined block size (e.g. 16 pixels by 16 pixels). In order to render the whole image on a display, all of the blocks should be decoded. When a digital image is decoded in the sequential method described above, it is sequentially decoded on a block-by-block basis, starting from the left upper end of a display 114 where the decoded image is to be rendered. On the other hand, when the digital image is decoded in the progressive decoding method described above, a low-resolution version of a whole image is initially displayed and the image becomes clear as the decoding proceeds by sequentially increasing the resolution of the image on the display. Despite the advantage of quick identification of the rough contour of the digital image, the progressive encoding method is lower in compression rate than the sequential encoding method. The memory 106 may be an internal or external memory. In case of an internal memory, the memory 106 may be a flash memory. In case of an external memory, the memory 106 may be a Secure Digital (SD) card, a memory stick, or a Multi-Media Card (MMC).

A decoder 108 decodes the digital image stored in the memory 106 and buffers the decoded digital image in a buffer 110 under the control of the controller 104. As stated before, depending on whether the digital image was progressively or sequentially encoded, the decoder 108 decodes the digital image using the progressive or sequential method. The decoder 108 temporarily stores the decoded image in the buffer 110.

In accordance with an exemplary embodiment, if digital image information stored in the memory 106 includes a low-resolution image, that is, a thumbnail image, a resizer 112 resizes the thumbnail image and outputs the resized thumbnail image to the display 114 before the high-resolution digital image has been decoded. The controller 104 may determine whether the digital image includes a thumbnail image by checking Exchangeable image file (Exif) information written in the digital image information. The file format of the digital image information is illustrated in FIG. 2.

Figure 2:
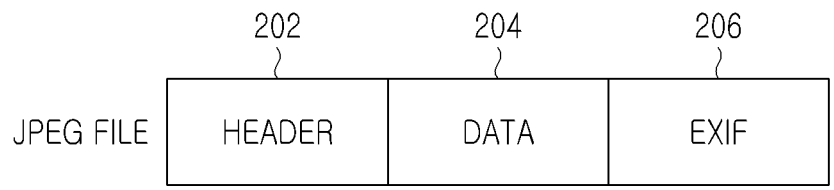
FIG. 2 illustrates the structure of a general JPEG-format digital image.

FIG. 2 illustrates the structure of a general JPEG-format digital image. Referring to FIG. 2, reference numeral 202 denotes the header of the JPEG-format digital image, reference numeral 204 denotes a compressed version of the digital image, and reference numeral 206 denotes Exif information. The Exif information 206 includes information about a manufacturer of a camera that has captured the digital image, a camera type, a captured date, a shutter speed, an F-number, use or non-use of flash, a zoom ratio, and the size and position of a thumbnail image.

In addition, the resizer 112, under the control of the controller 104, resizes a progressively or sequentially decoded digital image as well as the thumbnail image according to the size and resolution of the display 114 and outputs the resized digital image to the display 114.

The display 114 displays the data of the digital image decoded by the decoder 108 or the data of the thumbnail image at a predetermined resolution according to a predetermined display scheme under the control of the controller 104. In one exemplary embodiment, the display 114 may be a Liquid Crystal Display (LCD) driver (not shown) and a color LCD panel. When the display 114 includes a touch screen panel, it may also be used as an input device for receiving a command from the user.

A keypad 116 provides a specific key input received from the user as a signal to the controller 104, in one non-limiting exemplary embodiment. The controller 104 performs a predetermined operation according to the key input received from the keypad 116.

In accordance with an exemplary embodiment, the controller 104 determines whether a digital image selected from among digital images stored in the memory 106 by the user was progressively encoded. If the user-selected digital image was not encoded using the progressive method, the controller 104 determines that the user-selected digital image was encoded using the sequential method.

Once the encoding method is determined, the controller 104 determines whether a thumbnail image exists for the digital image, based on Exif information included in the digital image information. If a thumbnail image exists, the controller 104 controls the resizer 112 to resize the thumbnail image buffered in the buffer 110 according to the size and resolution of the display 114. While providing the thumbnail image of the digital image to the display 114, the controller 104 controls the decoder 108 to decode a high-resolution image included in the digital image information in a predetermined method. For example, if the digital image was encoded using the sequential method, the controller 104 controls the decoder 108 to decode the digital image on a block-by-block basis, in the direction beginning from the left upper part of the digital image to the right lower part of the digital image, and replaces the thumbnail image with the decoded digital image on a block-by-block basis on the display 114.

Figure 3:
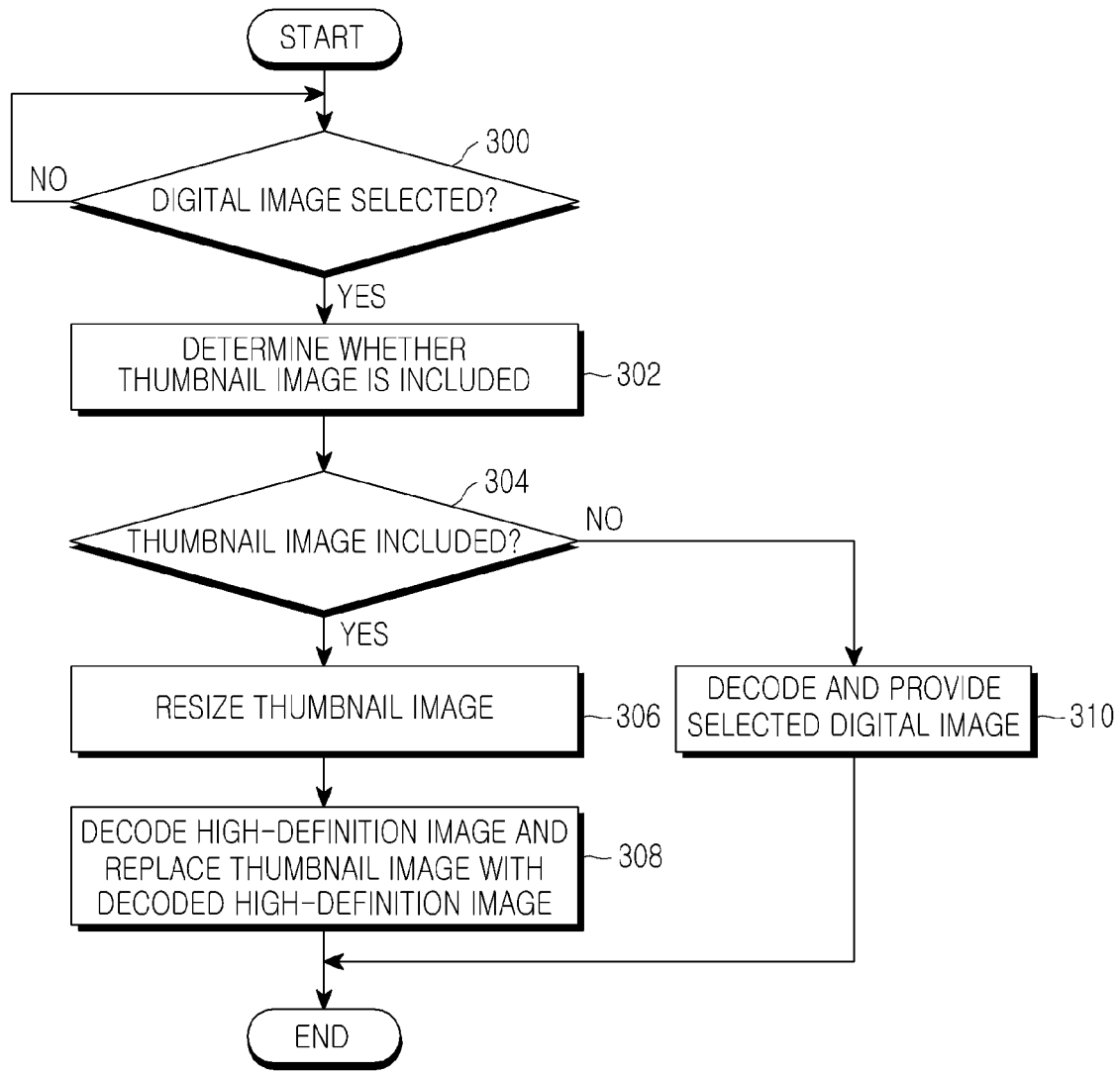
FIG. 3 is a flowchart illustrating a digital image processing method according to an exemplary embodiment.

FIG. 3 is a flowchart illustrating a digital image processing method according to an exemplary embodiment.

Referring to FIG. 3, the digital image processing apparatus determines whether a digital image has been selected in step 300. Upon selection of a digital image, the digital image processing apparatus, in step 302, determines, based on Exif information included in digital image information of the selected digital image, whether the digital image information includes a thumbnail image.

If the thumbnail image is included in the digital image information, the digital image processing apparatus resizes the thumbnail image included in the digital image information and provides the resized thumbnail image to the user on the display, in step 306. The resizing of the thumbnail image takes only a short time because the thumbnail image does not require decoding. While the digital image processing apparatus is providing the thumbnail image, it decodes a high-resolution image included in the digital image information and gradually replaces the thumbnail image with the decoded high-resolution image in step 308.

An example of the step of replacing the thumbnail image with the decoded high-resolution image in step 308 will be described with reference to FIG. 4.

Figure 4:
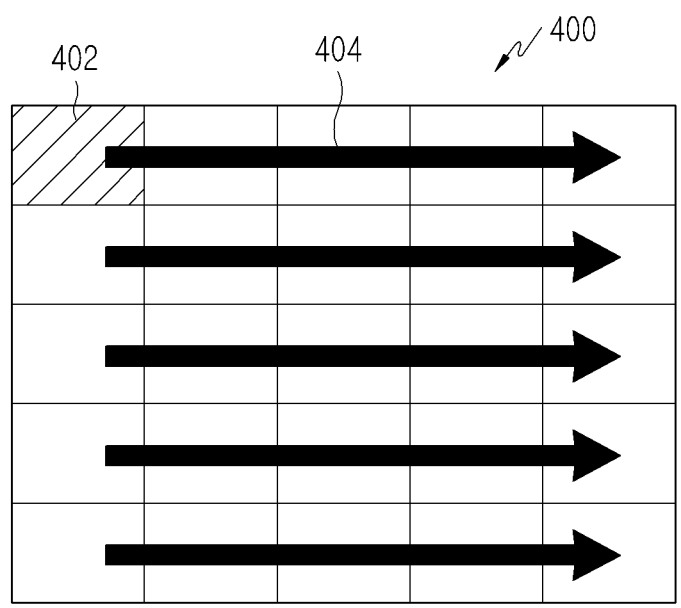
FIG. 4 illustrates an operation for replacing a thumbnail image with a high-resolution image decoded in a sequential scheme, on a block basis, according to an exemplary embodiment.

FIG. 4 illustrates an operation for replacing a thumbnail image with a high-resolution image decoded using the sequential method on a block-by-block basis, according to an exemplary embodiment.

Referring to FIG. 4, reference numeral 400 denotes an image displayed on the display and reference numeral 402 denotes a block of a predetermined size obtained by dividing the screen 400. While 20 blocks are illustrated in FIG. 4, this is a mere exemplary application and thus the number of blocks may vary with the size or resolution of the display. Reference numeral 404 depict arrows which denote a replacement direction from left to right. In this exemplary embodiment, each block 402 of the thumbnail image is replaced with a corresponding block of the decoded image in the replacement direction 404, from left to right.

Referring to FIG. 3 again, if the digital image information does not include a thumbnail image in step 304, the digital image processing apparatus decodes the selected digital image and provides the decoded digital image in step 310.

In the above exemplary embodiment, even though a digital image is encoded using the sequential method, when the digital image information includes a thumbnail image, a low resolution version of the whole digital image may be provided to a user using the thumbnail image before the full resolution version of the whole digital image is provided. Providing the thumbnail image to the user in advance during a sequential decoding method of the digital image provides a similar effect to the progressive method, as even though the user selects a high-resolution digital image to be displayed, he may immediately get a rough version of the digital image based on its thumbnail image.

As is apparent from the above description, when a user-selected high-resolution image is to be displayed on a display, a low resolution version of the user-selected high-resolution image is first displayed to the user, thereby decreasing a waiting time perceived by the user before an image is displayed on the display.

Further, providing the low resolution image to the user while the high-resolution image is decoded increases the convenience of displaying images on a mobile terminal.

Exemplary embodiments may be embodied as computer-readable codes on a computer-readable recording medium. The computer-readable recording medium is any data storage device that can store data which can thereafter be read by a computer system executing the code with a processor. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, function programs, codes, and code segments for accomplishing exemplary embodiments can be easily construed as within the scope of the invention by programmers skilled in the art to which the exemplary embodiments pertain.

While the invention has been shown and described with reference to certain exemplary embodiments, it will be understood by those skilled in the art that various changes in form and details may be made therein without departing from the spirit and scope of the exemplary embodiments as defined by the appended claims and their equivalents.

What is claimed is:

1. An apparatus for processing a digital image, the apparatus comprising:
   a controller;
   a decoder that decodes a high-resolution image from image information and outputs the decoded high-resolution image to a display;
   a resizer that resizes a thumbnail image according to a size and resolution of the display and outputs the resized thumbnail image to the display; and
   the display that displays the resized thumbnail image, then replaces the thumbnail image with the decoded high-resolution image received from the decoder,
   wherein, when replacing the thumbnail image, the thumbnail image and high-resolution image are divided into corresponding blocks, and one block of the thumbnail image is sequentially replaced with the corresponding block of the decoded high-resolution image.

2. The apparatus according to claim 1, further comprising a memory for storing the image information.

3. The apparatus according to claim 2, wherein the controller determines whether the image information includes the thumbnail image and, if included, provides the thumbnail image to the resizer.

4. The apparatus according to claim 3, wherein the high-definition image is encoded using one of a sequential method and a progressive method.

5. The apparatus according to claim 3, wherein the controller determines whether the thumbnail image is included in the image information by checking Exchangeable image file (Exif) information in the image information.

6. A method for processing a digital image using image information, the method comprising:
   resizing, at a processor, a thumbnail image from the image information according to a size and resolution of a display;
   displaying the resized thumbnail image on the display;
   decoding a high-resolution image from the image information; and
   replacing the thumbnail image with the decoded high-resolution image by dividing the thumbnail image and high-resolution digital image into corresponding blocks, and sequentially replacing one block of the thumbnail image at a time with the corresponding block of the decoded high-resolution image.

7. The method according to claim 6, further comprising determining whether the image information includes the thumbnail image.

8. The method according to claim 7, wherein the high-definition image is encoded using one of a sequential method and a progressive method.

9. The method according to claim 7, wherein determining whether the image information includes the thumbnail image further comprises checking Exchangeable image file (Exif) information in the image information.

10. The method according to claim 8, wherein determining whether the image information includes the thumbnail image further comprises checking Exchangeable image file (Exif) information in the image information.

11. A method for displaying a high-resolution digital image on a mobile terminal, the method comprising:
  decoding a high-resolution digital image;
  displaying a thumbnail image of the high-resolution image on a display of a mobile terminal while the high-resolution image is being decoded;
  replacing the thumbnail image with the decoded high-resolution digital image by dividing the thumbnail image and high-resolution digital image into corresponding blocks, and sequentially replacing one block of the thumbnail image at a time with the corresponding block of the decoded high-resolution image.

12. The method of claim 11, further comprising resizing the thumbnail image according to a size and resolution of the display before displaying the thumbnail image.

13. The method of claim 11, wherein the high-resolution digital image is a Joint Photographic Experts Group (JPEG) file format.

14. An apparatus for displaying a high-resolution digital image on a mobile terminal, the apparatus comprising:
  a decoder that decodes the high-resolution digital image;
  a controller that displays a thumbnail image of the high-resolution image on a display of a mobile terminal while the decoder is decoding the high-resolution digital image; and replaces the thumbnail image with the decoded high-resolution digital image,
  wherein the controller divides the thumbnail image and high-resolution digital image into corresponding blocks, and sequentially replaces one block of the thumbnail image at a time with the corresponding block of the high-resolution digital image.

15. The apparatus according to claim 14, further comprising a resizer that resizes the thumbnail image according to a size and resolution of the display before displaying the thumbnail image.

16. The apparatus according to claim 14, wherein the high-resolution digital image is a Joint Photographic Experts Group (JPEG) file format.

* * * * *